July 31, 1962
A. B. WINSLETT
3,047,798
FLASHLIGHT TESTER
Filed July 13, 1959
2 Sheets-Sheet 1
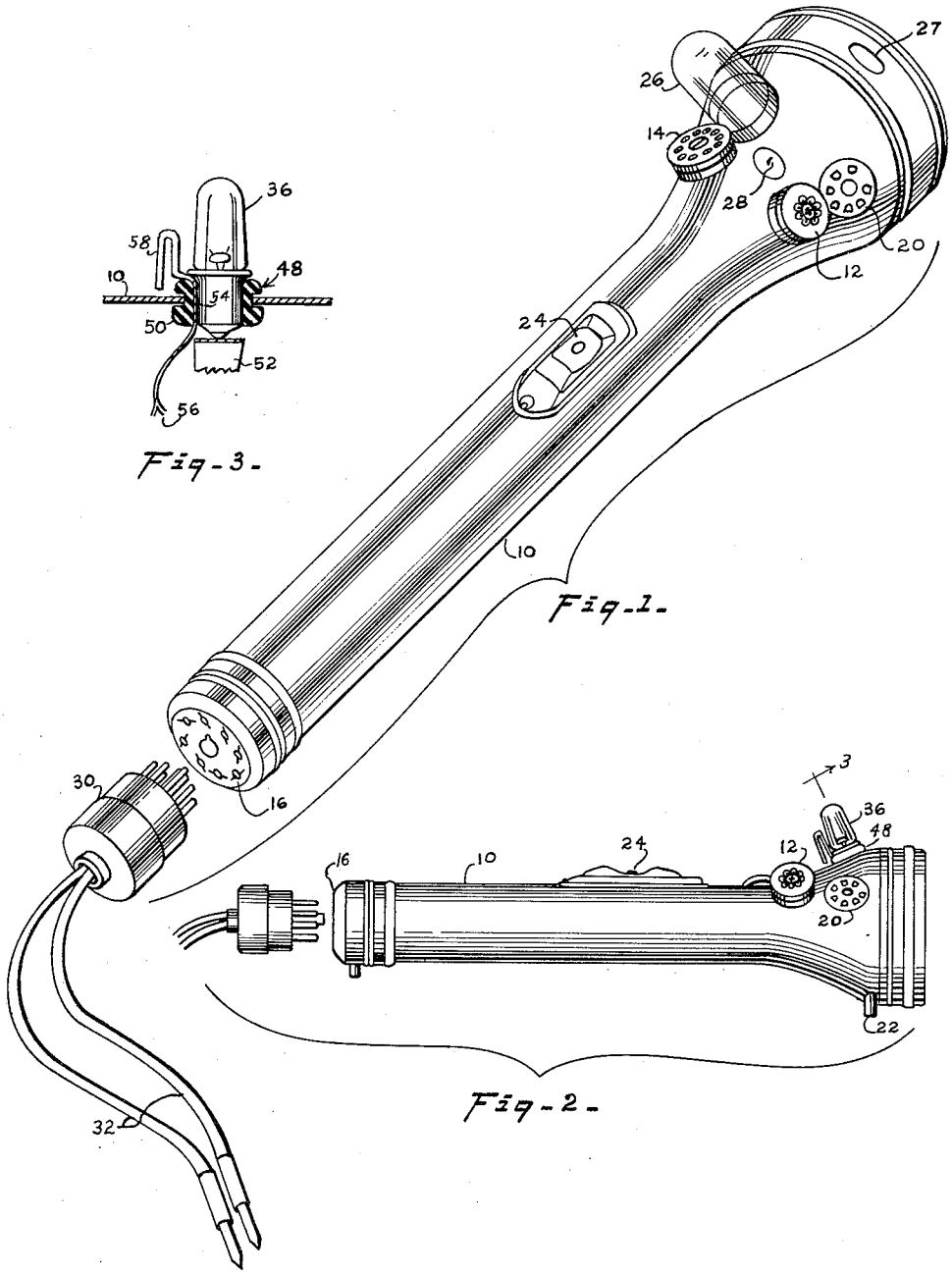
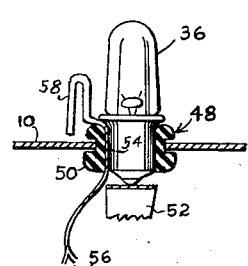
Fig-3-
Fig-1-
Fig-2-
INVENTOR.
ARTHUR B. WINSLETT
BY
A#y.

July 31, 1962  A. B. WINSLETT  3,047,798
FLASHLIGHT TESTER
Filed July 13, 1959  2 Sheets-Sheet 2
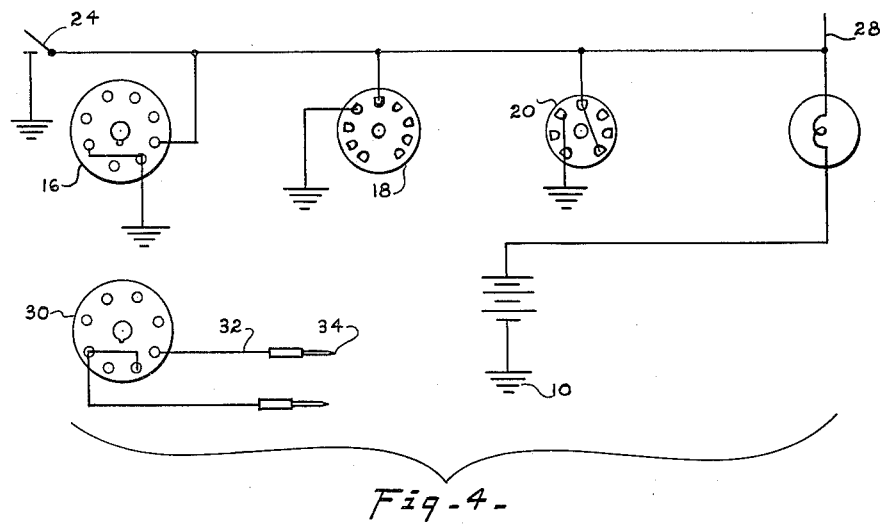
Fig-4-
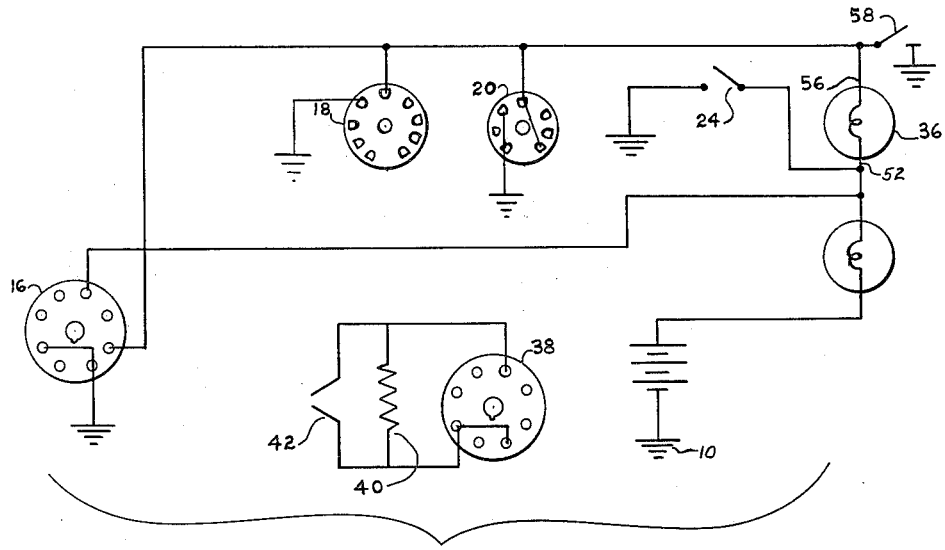
Fig-5-
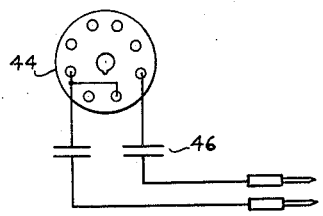
Fig-6-
INVENTOR.
ARTHUR B. WINSLETT
BY
Atty.

3,047,798
FLASHLIGHT TESTER
Arthur B. Winslett, P.O. Box 431, San Simon, Ariz.
Filed July 13, 1959, Ser. No. 826,586
8 Claims. (Cl. 324—53)

This invention pertains to flashlight testers and more particularly to a tool adapted for the combined use as a portable lamp and vacuum tube tester.

One of the common causes for service on radio and television sets are open filaments of vacuum tubes. Other common faults are: shorter condensers, open resistors, blown fuses, etc. Therefore, one of the principal needs of a television repairman is a continuity tester. With a continuity tester the repairman may check the continuity of vacuum tube filaments, resistors, shorts in condensers, circuits, etc. More generally than not, the electronic circuits are enclosed in cabinets which are often pieces of furniture in inaccessible portions of the room. The repairmen needs a light to see the various components of the set.

An object of this invention is to provide a combination light and continuity tester in a single tool.

Another object of this invention is to provide such a tool which limits the current so that there is no likelihood of overloading delicate components, ruining them.

Another object is to provide such a tool which is readily adaptable for testing vacuum tubes, fuses, and also provided with test leads for miscellaneous testing.

A further object is to provide such a tool which additionally is adapted for checking automobile electrical components.

A further object is to provide such a tool which is adapted to check for the presence of power of the order of 110 volts and higher.

A further object is to provide a tool as above that is adapted to be used as a warning blinker lamp.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which:

FIG. 1 is a perspective view of the device with the test leads.

FIG. 2 is an elevational view of a modified form of the invention.

FIG. 3 is a partial cross sectional view taken on lines 3—3 of FIG. 2.

FIG. 4 is a schematic diagram of the electrical connections of the models shown in FIG. 1.

FIG. 5 is a schematic diagram of the electrical connections of the model shown in FIG. 2.

FIG. 6 is a schematic diagram of another modification.

As may be seen in the accompanying drawings, the tool is built around a standard flashlight having case 10. The case is metallic and generally tubular in form. Three dry cells are used, each having about a volt and one-half so that there is a total of four and one-half volts available. The case is physically altered by the addition of two pin straighteners 12 and 14 along the case near the lens of the original flashlight. These pin straighteners are solid metal devices for straightening bent pins of peanut tubes. Two are provided because one is adapted to straighten the pins upon a seven pin tube while the other is adapted to straighten the pins upon a nine pin tube.

The standard flashlight is also modified by the inclusion of three tube sockets 16, 18 and 20. Tube socket 16 is a socket for an eight pin tube. Due to its size it is located at the end of the case, opposite from the lens; co-axial with the case. Socket 18 is located adjacent to the lens in the tubular case of the tool. The seven pin socket 20 is likewise mounted adjacent the lens as shown in the conic area where the case flares to the lens. The seven pin and nine pin sockets are located reasonably colse to each other. On the side opposite the seven and nine pin tube sockets are two legs 22. These legs are made of small rubber buttons so that the tool is adapted to be laid upon a flat surface without rolling.

The test tool as shown in FIG. 1 is electrically connected as shown in FIG. 4. The dry cells are grounded to the metal cylindrical case. The other side of the batteries are connected in series through the lamp and the switch 24 which is the standard switch provided on the flashlight. Also connected in series with the lamp and batteries are the tube sockets. On the eight pin sockets pin No. 7 is connected to this point. On the nine pin socket it is pin No. 5. On the seven pin socket it is pins Nos. 4 and 7. On the eight pin socket pins Nos. 2 and 8 are grounded to the metal case. On the nine pin socket pin No. 4 is grounded whereas on the seven pin sockets pins Nos. 3 and 1 are grounded. These are the pins which are normally and standardly connected across the filament of the vacuum tube. For example, if a nine pin vacuum tube 26 is inserted in the nine pin socket (as shown) there will be a complete circuit from the battery through the lamp, through the filament of the vacuum tube, back into the case. As the resistance of the tube filament is relatively small as compared to that of the lamp, the lamp will light giving a visual indication that the filament is continuous. If the filament is burned out or open, the light will not burn. The window 27 provides an opening through which the lamp may be observed.

Test point 28 is connected on the metal case of the flashlight and electrically insulated from the case. The point 28 is located between the two pin straighteners. In this way the pin straighteners serve as a guard to prevent accidental contact. The test point is electrically connected to the electrical connection extending from the lamp to the switch. Thereby a fuse may be tested by placing it between the test point and metal case. If the fuse is good the lamp will give a visual indication. If the fuse is open the lamp will remain dark as in a case of an open filament for a tube.

In order not to damage low amperage components, a lamp bulb of three volts and .06 ampere rating is used. With the additional resistance provided by other components, the current is so small that there is no danger of damaging any components found in commercial installations. The three volt .06 ampere lamps are sometimes difficult to find commercially. In such cases it is possible to substitute a 2 volt .06 ampere lamp. The life of such a lamp is not as long as the 3 volt lamp but adequate safe guards are provided for the components being tested by this lamp.

Vibrators, transistors, transformers etc. may be tested upon the device of this invention in addition to the items enumerated above.

If it is desired to have test leads extending from the tool, two leads are connected into a male plug 30 which has a standard tube base. (FIG. 1.) The standard base has two flexible leads 32 which terminate with either alligator clips or needle points 34. If the test points 34 are connected across any component with a low electrical resistance, the indicator lamp will so indicate.

FIGS. 2 and 5 illustrate a modification using second lamp 36. The lamp is located on the tubular case between the tube sockets 18 and 20. The second lamp is electrically connected as seen in FIG. 5. The battery is connected in series with the first lamp and the lamp switch. From this point the second lamp is in series with the socket connections. If a connection is made between pins 2 and 7 of the eight pin socket 16, there is a complete electrical path from the base through the socket and the tested item, through the second lamp, through the first lamp, through the batteries, and back to the base. In this embodiment I desire to use the principal lamp behind the lens of three volt, .50 amp.; the second lamp of three volt .06 amp. As the resistance of the .50 ampere lamp is so much lower in comparison with the second lamp, the second lamp only will glow when the current passes through them.

In this modification there is also a connection from the ungrounded side of the light switch to pin 5 of socket 16. This makes it possible to use a special blinker plug 38. This blinker plug has a standard male base for a pin socket so that it may plug in socket 16. The base is electrically connected with a terminal at pin 2 and another terminal at pin 5. Across these two terminals is connected a thermal blinker device. These devices are well known to the art and will be only briefly described, as follows: There is a resistance wire 40 which has connected in parallel with contact points 42, therefore with the plug inserted there will be a closed circuit through the resistor 40. As this heats up it causes the contact point 42 to come in contacts. This shorts out the resistor causing no current to flow through it allowing it to cool. Also it does complete a low resistance path through the main lamp causing it to light. I prefer to blink the main lamp as it is brighter than the second or test lamp. As the resistor 40 cools it causes the contact points 42 to break which turns out the lamp. In this way the blinking of the lamp is obtained. A blinking lamp is desirable if mechanical difficulty is experienced with the service truck and it is necessary to leave it parked along the highway. Otherwise it is useful to have such a device when the service truck is parked along a street in residential areas at night.

Another modification which is available is a 110 volt test plug 44. It is desirable to check if power is at any particular point. This is true either for a television repairman or a general electrician. Such tool has advantage because often it may be used in dark attics, basements etc. Plug 44 has a .01 microfarad 1000 volt condenser 46 attached to terminals 2 and 7 in series with the flexible leads. The second lamp 36 in this case is a neon glow lamp. If the test leads are connected to a source of at least 110 volts alternating current, the neon lamp will glow. The electrical connection will be through the condensers and pins 2 and 7 through the base, batteries, and glow lamp, unless switch 24 is closed, then no current flows through the batteries.

In a similar manner to the modification illustrated in FIG. 6 the tool may be used to check for the presence of voltage on an automobile. In this case the condensers are not necessary. However, it is necessary to replace the second bulb 36 with a bulb adapted to withstand the voltages found on the automobile particularly in the case of a 12 volt ignition system.

As will be noted, several different bulbs may be used for the second bulb 36. Some of these bulbs may have screw bases while others may have bayonet bases. For that reason, I prefer to use the special type socket 48 for the second lamp 36 as may be more clearly seen in FIG. 3. This socket has as one of its principal elements a soft rubber grommet 50. Immediately below and coaxial with the grommet is a contact 52 for the central lamp terminal. Attached along one of the inner sides of the grommet is an electrical conductor contact 54. As may be seen the contact 54 has an electrical connection 56. A portion of this thin strip of metal 54 extends out over the outside of the grommet as a projection 58. The projection 58 serves a dual purpose. It may be depressed against the side of the casing to provide an electrical switch thereby connecting the circuit and turning on the test lamp 36. Also it may be used as a test point to contact one side of a fuse to the point 58 and another to the case 10. It may be seen with the soft rubber grommet 50 and the plate of thin metal 54 that the socket is adapted to accommodate either screw base or bayonet base lamps.

It will be apparent that the embodiments shown are only exemplary and that various modifications can be made in construction, materials, and arrangements within the scope of the invention as defined in the appended claims.

I claim as my invention:

1. A flashlight tester comprising: a tubular case, a plurality of batteries within said case, a first lamp, a switch, electrical connecting means for connecting said batteries, first lamp, switch, and case in series; a second lamp, said second lamp having a much higher resistance than said first lamp, a plurality of vacuum tube sockets attached to said case, electrical connecting means for connecting said batteries, first lamp, second lamp, and tube sockets in series whereby said second lamp and tube sockets are parallel to said switch.

2. The invention as defined in claim 1 with the addition of an electrical test point terminating on the exterior of the case which is in series with said lamps, batteries, and case, therefore in parallel with said switch and sockets.

3. The invention as defined in claim 1 with the addition of a plug in one of said tube sockets, said plug having two flexible test leads connected thereto, said flexible test leads being electrically connected to said pins which are the tube socket pins connected in series with the lamps.

4. The invention as defined in claim 1 with a vacuum tube in one of said sockets, the vacuum tube filament being in said pin connections which are connected in series with the lamp and batteries.

5. The invention as defined in claim 1 with the addition of a thermal alternating means in one of said sockets, said thermal alternating means being for making and breaking the connections of the pins that are connected in series with said batteries and lamp.

6. The invention as defined in claim 2 with the addition of pin straighteners on the exterior of the case, said pin straighteners projecting beyond the surface of the case, said pin straighteners on either side of said test point thus serving to protect the test point against accidental contact.

7. A flashlight tester comprising: a tubular case, plurality of batteries in said case, a lamp, a switch, electrical connections connecting said batteries, lamp, switch, and case in series, a plurality of tube sockets connected in said case, said tube sockets being means for inserting a standard vacuum tube there, electrical connections connecting certain designated pins of said tube sockets in series with said batteries, lamp, and case, therefore said sockets being in parallel with said switch, an electrical test point terminating on the exterior of the case which is in series with said lamp, batteries, and case and therefore in parallel with said switch and sockets, pin straighteners on the exterior of the case, said pin straighteners projecting beyond the surface of the case, said pin straighteners on either side of said test point thus serving to protect the test point against accidental contact.

8. A flashlight tester comprising: a tubular case, plurality of batteries in said case, a lamp, a switch, electrical connections conecting said batteries, lamp, switch, and case in series, a plurality of tube sockets connected in said case, said tube sockets being means for inserting a standard vacuum tube therein, electrical connections connecting certain designated pins of said tube sockets in series with said batteries, lamp, and case, therefore said sockets being in parallel with said switch, a second lamp in series with said tube sockets, said second lamp having a much higher resistence than said first mentioned lamp, said second lamp and tube sockets being in parallel with said switch.

References Cited in the file of this patent

UNITED STATES PATENTS

| | | |
|---|---|---|
| 2,695,403 | Stoker et al. | Nov. 23, 1954 |
| 2,746,011 | Carson | May 15, 1956 |
| 2,752,563 | Bowden | June 26, 1956 |
| 2,804,611 | Craddock | Aug. 27, 1957 |
| 2,839,724 | Chandler et al. | June 17, 1958 |
| 2,846,644 | Costello | Aug. 5, 1958 |
| 2,881,385 | Smith | Apr. 7, 1959 |
| 2,902,643 | Pasquale | Sept. 1, 1959 |
| 2,911,637 | Wortmann | Nov. 3, 1959 |
| 2,915,744 | Lewis | Dec. 1, 1959 |